United States Patent [19]

Nakamura

[11] Patent Number: 5,392,112
[45] Date of Patent: Feb. 21, 1995

[54] INCLINATION ANGLE METERING APPARATUS

[75] Inventor: Masahiro Nakamura, Yokohama, Japan

[73] Assignee: Nikon Corporation, Tokyo, Japan

[21] Appl. No.: 237,916

[22] Filed: May 4, 1994

Related U.S. Application Data

[63] Continuation of Ser. No. 26,573, Mar. 5, 1993, abandoned.

[30] Foreign Application Priority Data

Mar. 11, 1992 [JP] Japan ................................. 4-052286

[51] Int. Cl.⁶ ..................... G01B 11/26; G01C 9/06; G01C 1/10
[52] U.S. Cl. .................................. 356/139.1; 33/366; 33/377; 356/148; 356/219
[58] Field of Search ................... 356/139.1, 148, 249; 33/366, 377

[56] References Cited

U.S. PATENT DOCUMENTS

| | | | |
|---|---|---|---|
| 2,968,228 | 1/1961 | Merritt | 356/148 |
| 3,667,849 | 6/1972 | Appler et al. | 356/139.10 |
| 3,741,656 | 6/1973 | Shapiro | 356/103 |
| 3,960,077 | 6/1976 | Aylett | 356/212 |
| 4,136,955 | 1/1979 | Aeschlimann et al. | 356/152 |
| 5,227,862 | 7/1993 | Oshida et al. | 356/363 |

Primary Examiner—Stephen C. Buczinski
Attorney, Agent, or Firm—Shapiro and Shapiro

[57] ABSTRACT

An inclination angle metering apparatus is arranged such that a beam from a light source is split into two beams by a half-mirror provided in a light path between the light source and the surface of a liquid. One beam is reflected by the liquid surface falls on a line sensor, and the other beam falls on the line sensor without reflected by the liquid surface. When a housing and the liquid are relatively inclined, an incident position of one beam changes on the line sensor, whereas an incident position of the other beam does not change. An inclination angle to the liquid surface is determined based on the incident position of one beam with respect to the incident position of the other beam.

18 Claims, 5 Drawing Sheets

INCLINATION ANGLE METERING APPARATUS

This is a continuation of application Ser. No. 08/026,573, filed Mar. 5, 1993, now abandoned.

BACKGROUND OF THE INVENTION

1. Field of the Invention

The present invention relates to an inclination angle metering apparatus for metering an inclination angle of a body of equipment with respect to a direction of gravity.

2. Related Background Art

FIG. 7 shows one example of a conventional inclination angle metering apparatus. In this apparatus, a beam of light Ls outgoing from a light source 101 is restricted in a predetermined shape (e.g., a slit- or pinhole-like shape) by a stop 102. The beam is converted to substantially collimated rays of light through a collimator lens 103 and falls on a prism 104. The beam Ls is incident at a predetermined angle of incidence (e.g., 45°) on a liquid surface 106a via this prism 104. A transparent liquid 106 is sealed in a casing 107 above the prism 104. This prism 104 and the transparent liquid 106 both have substantially the same refractive index.

The beam Ls passing through the prism 104 is full-reflected by the liquid surface 106a of the liquid 106. The beam Ls reflected by the liquid surface 106a again penetrates the prism 104. The beam Ls is condensed through a condenser lens 108 on a light receiving element 109 such as a CCD line sensor or the like. A pattern of the stop 102 is formed on this light receiving element 109.

Now, let A be a condensing position on a light receiving element 109 when the equipment incorporating the abovementioned inclination angle metering apparatus is in a horizontal state. This position A is then stored. Even when the equipment is skewed, the horizontality of the liquid surface is always kept. Hence, it follows that the liquid surface is inclined (a state indicated by a broken line 106b in the Figure) to the equipment when viewed in a relative manner. Therefore, a light path of the beam reflected by a liquid surface 106b changes as indicated by a broken line Ls'. The condensing position on the light receiving element 109 shifts to a position B. This position B is detected, and the inclination angle is obtained based on a deviation from the previously stored position A.

The conventional inclination angle metering apparatus, however, presents the following drawback. If the optical system and the light receiving element which constitute this inclination angle metering apparatus are minutely shifted in placement due to vibrations and impacts or variations in temperature, etc., then even when in the horizontal state, it the condensing position on the light receiving element shifts from the position A described above. Consequently, an error is caused in the metered inclination angle. Note that in this connection, the error is also produced even when the liquid surface is relatively inclined.

SUMMARY OF THE INVENTION

It is a primary object of the present invention to provide an inclination angle metering apparatus capable of preventing an error in a metered inclination angle from being caused due to a shift in placement of the abovementioned optical system and light receiving element.

The inclination angle metering apparatus according to this invention includes a light path splitting means (5) disposed in a light path between a first optical system (3) and a liquid surface (6a).

According to the present invention, the light path splitting means splits a beam before reaching the liquid surface into two beams. One beam is condensed by a beam metering means without passing to the liquid surface (without being reflected by the liquid surface) and employed as a fiducial beam. The other beam reflected by the liquid surface is condensed by the beam metering means and employed as a metering beam.

Both of these two beams pass through the common optical system and optical element other than the liquid surface. Hence, even if the optical system and the optical element are shifted in terms of placement, the fiducial beam and the metering beam are always kept in a predetermined relationship. Namely, when the optical system and the optical element are shifted in placement, substantially the same influence is exerted both on the fiducial beam and on the metering beam. The inclination angle can be always precisely metered by obtaining a condensing position of the metering beam with respect to a condensing position of the fiducial beam.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 1:
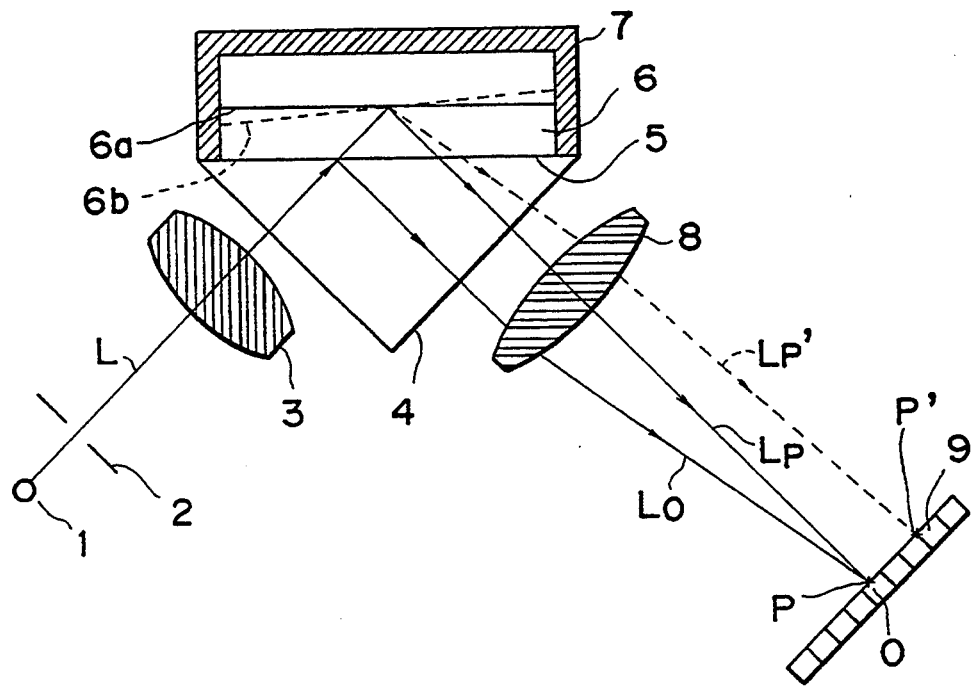
FIG. 1 is a view schematically illustrating a configuration of an embodiment of this invention.

An inclination angle metering apparatus in a first embodiment is constructed of members shown in FIG. 1. The metering apparatus is temporarily held integrally in a housing of a support board of surveying equipment such as, e.g., a transit theodolite. Referring to FIG. 1, a beam of light L outgoing from a light source 1 passes through a slit 2 and further through a condenser lens 3, thereby becoming substantially collimated rays of light. The collimated rays are led to a prism 4. This prism 4 is formed of glass shaped in a right-angled triangle and having a refractive index on the order of 1.5. Its bottom surface serves as that of a container 7. A silicon oil 6 defined as a liquid having a refractive index of 1.4 is so sealed between the prism 4 and the container 7 as to be freely movable. Further, the bottom surface of the prism 4 serves as a half-mirror 5. The beam L falls on the prism 4, and a part of the beam is thereafter reflected by the half-mirror 5. The rest of beam penetrates the half-mirror 5. The reflected beam emerges from the prism 4 in the form of a beam of light Lo. The beam Lo is condensed in a position O on a CCD line sensor 9 defined as a light receiving element via a condenser lens 8. This position O is always fixed. That is, the respective optical members given above are relatively located by a housing for fixing them. Hence, the relative positions do not normally change. Accordingly, even if a liquid surface and the housing for holding the individual optical members are relatively inclined, this position O is fixed.

On the other hand, the beam penetrating the half-mirror 5 is full-reflected by a surface 6a of the liquid 6 sealed in the container 7 and passes through the prism 4 in the form of a beam of light Lp. The beam Lp is condensed in a position P on the line sensor 9 via the condenser lens 8. Due to the effect of gravity, the liquid surface 6a is horizontal irrespective of an inclination of the housing. The housing is not, however, so installed as to be fixed with respect to gravity. Hence, the liquid surface and the housing may be relatively inclined. If both of them are relatively inclined, the liquid surface 6a changes to a surface 6b. Then, with a change of this liquid surface, the beam Lp shifts to a position of a beam Lp'. Further, the position P on the line sensor 9 shifts to a position P'. Therefore, the inclination angle of the housing is expressed as a displacement quantity between the condensing position of the beam Lp and the condensing position of the beam Lo.

Figure 2:
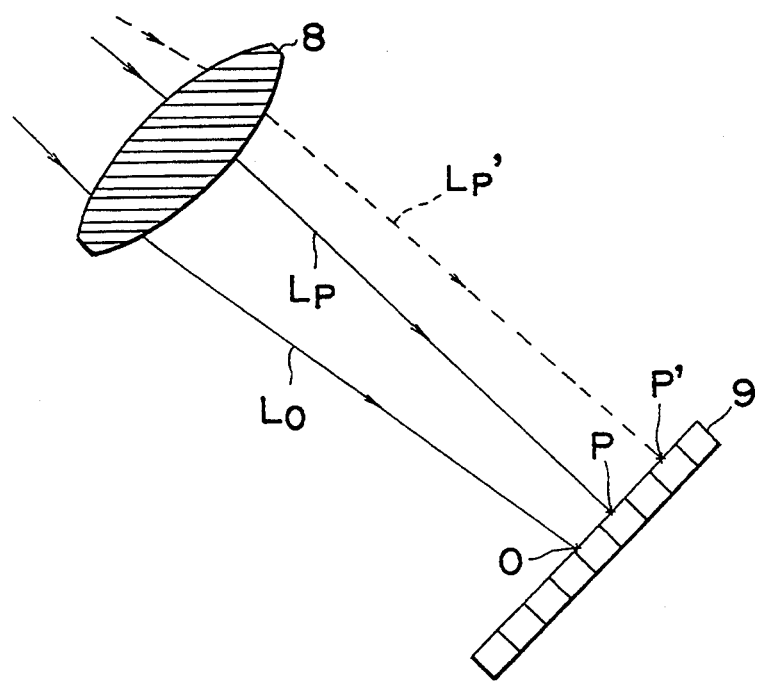
FIG. 2 is a partially enlarged view of a modification of the embodiment of FIG. 1.

Note that the beam Lo and the beam Lp when the housing and the liquid surface are not relatively inclined may be, as illustrated in FIG. 2, detected in different positions on the line sensor 9. In the case of FIG. 2 also, the inclination angle of the apparatus with respect to the liquid surface is expressed as a displacement quantity between the condensing position of the beam Lo and the condensing position of the beam Lp.

Figure 3:
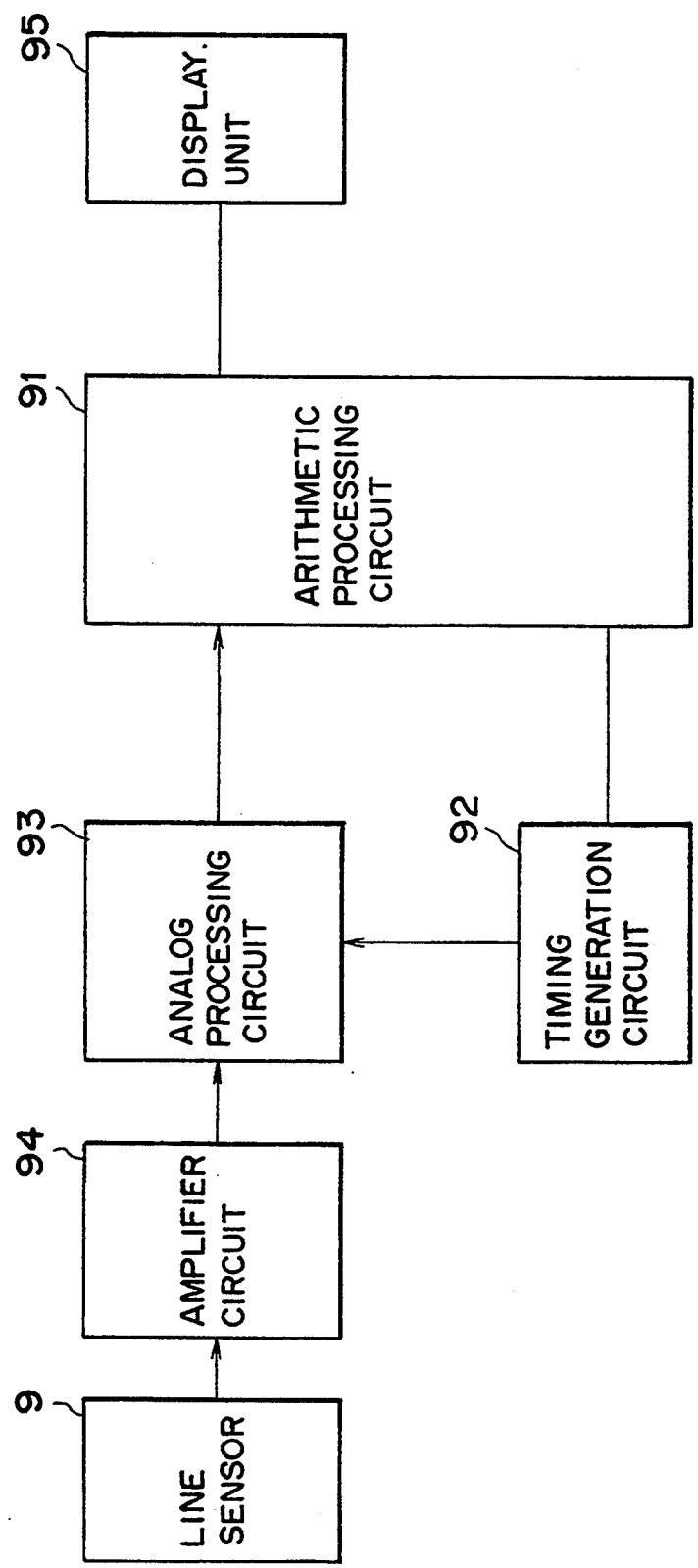
FIG. 3 is a block diagram showing a processing circuit of a light receiving element shown in FIG. 1.

The displacement quantity detected by the CCD line sensor 9 is converted into an inclination angle of the housing through a processing circuit shown in FIG. 3 and then displayed. An arithmetic processing circuit 91 indicates a timing for detecting the displacement quantity to a timing generation circuit 92. The timing generation circuit 92 outputs a timing signal to an analog processing circuit 93.

The analog processing circuit 93 causes an amplifier circuit 94 to amplify analog signals corresponding to quantities of beams received by respective pixels of the line sensor 9 sequentially from the terminal of the line sensor 9 in accordance with the timing signals. Thereafter, amplified signals are binarized with a predetermined threshold value and thus converted into digital data. More specifically, if the beam is detected at a pixel of the CCD line sensor 9, the analog processing circuit 93 makes, a conversion into digital data of [1], whereas if the beam is not detected, the circuit 93 effects a conversion into digital data of [0]. This data conversion is continuously conducted from the pixel of one terminal of the line sensor 9 to that of the other terminal thereof.

The thus converted digital data is further converted into a value of the inclination angle of the body by means of the arithmetic processing circuit 91. The arithmetic processing circuit 91 detects a time between the condensing position of the beam Lo and the condensing position of the beam Lp from the converted digital data. A degree of inclination of the housing is computed from this detected time and a corresponding table. The value of inclination angle that has been computed by the arithmetic processing circuit 91 is displayed on a display unit 95.

Note that the corresponding table described above is prepared from the data metered when incorporating the inclination angle metering apparatus into the housing. The metered data consist of: a time between the condensing position of the fiducial beam Lo and the condensing position of the metering beam Lp when the inclination angle of equipment, e.g., surveying equipment incorporating this inclination angle metering apparatus is 0 degree; and a time between the condensing position of the fiducial beam Lo and the condensing position of the metering beam Lp when the surveying equipment is inclined at a plurality of proper but different angles other than 0 degree. These metering data are stored in the form of a corresponding table in a memory in the arithmetic processing circuit 91.

In accordance with this embodiment, even when the lenses 3, 8 and the line sensor 9 which constitute the inclination angle metering apparatus are disposed with deviations, both of the fiducial beam and the metering beam pass through the same optical member other than the liquid surface. Accordingly, the relative relationship between the position 0 and the position P does not change.

Note that the half-mirror 5 is not limited to the one in which a light quantity ratio of the reflected light to the transmitted light is 1:1. Half-mirrors having arbitrary ratios are also usable.

Figure 4:
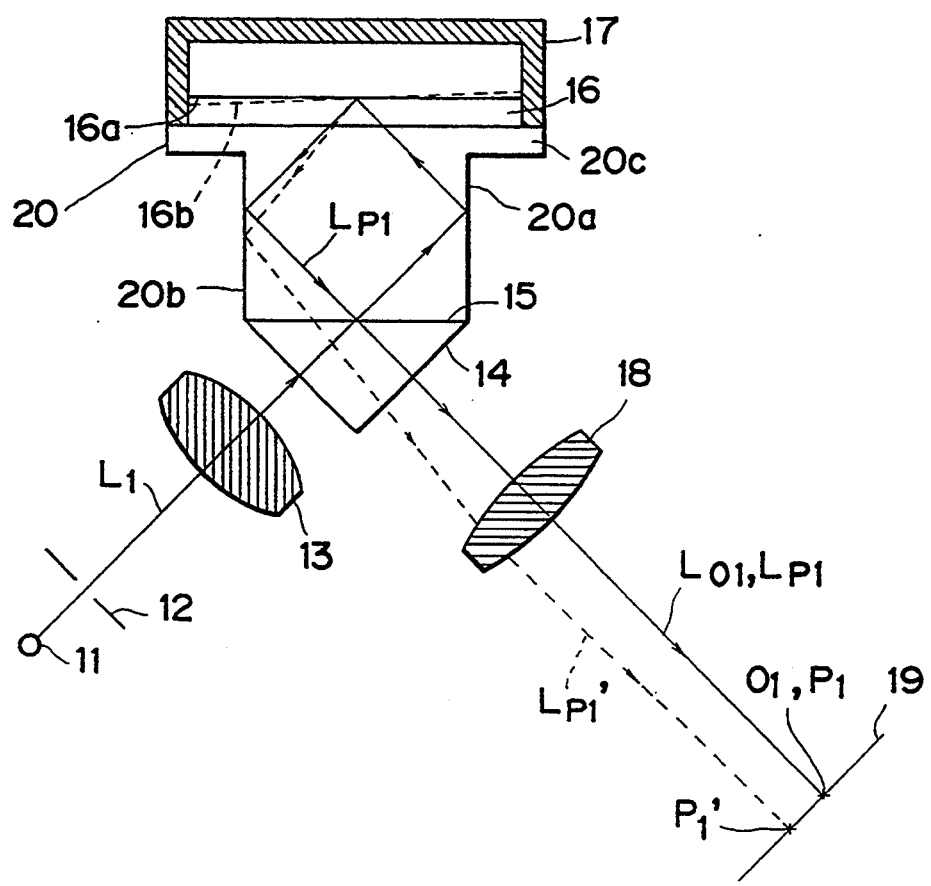
FIG. 4 is a view schematically showing a configuration of a second embodiment.

FIG. 4 shows a second embodiment of the present invention. The second embodiment has basically the same configuration as that of the apparatus illustrated in FIG. 1. A different point is, however, such an arrangement that an optical member 20 is interposed between a prism 14 and a liquid 16. This optical member 20 includes two reflection planes 20a, 20b and a bottom plate 20c serving as a bottom surface of the container 17. A pair of reflection planes 20a, 20b are parallel to each other in a face-to-face relationship. A beam L1 penetrating the half-mirror 15 is temporarily reflected by the reflection plane 20a and thereafter falls on the liquid surface 16a. A beam Lp1 reflected by the liquid surface 16a is further reflected by the reflection plane 20b. The beam Lp1 is condensed on the line sensor 19 via the half-mirror 15 and a condenser lens 18 as well. In this case, if a size of an optical member 20 is set to a proper design value, as illustrated in FIG. 4, an optical axis of the beam Lo1 reflected by the half-mirror 15 can be made substantially coincident with an optical axis of the beam Lp1 reflected by the liquid surface 16a. A diameter of the condenser lens 18 can be made smaller than in the apparatus shown in FIG. 1.

A third embodiment shown in FIG. 5 will be discussed. In this embodiment, unlike the first and second embodiments wherein the beam is incident from underneath the liquid 26, a beam L2 is incident from above of the liquid 26. The beam L2 from a light source 21 obliquely falls on a liquid surface 26a via a slit 22 and a condenser lens 23. The liquid 26 flows into a container 27 having its bottom surface formed of a part of a prism 24. This container 27 has an opening formed upward.

The beam L2 is temporarily incident on a half-mirror 25 through the liquid surface 26a. The beam obliquely falling thereon is split into two rays of light by means of the half-mirror 25 formed on the prism 24. A beam Lo2 penetrating the half-mirror 25 constitutes a fiducial beam, while the beam Lp2 reflected by the half-mirror 25 constitutes a metering beam. Other aspects are the same as those in the apparatus shown in the first and second embodiments.

In the case of this embodiment, a large proportion of the light quantity of the beam L2 incident on the liquid 26 is reflected by the liquid surface. A trace quantity of light reaches a line sensor 29. It is therefore required that the quantity of the beam L2 be increased or alternatively the line sensor 29 be enhanced in terms of sensitivity.

Figure 5:
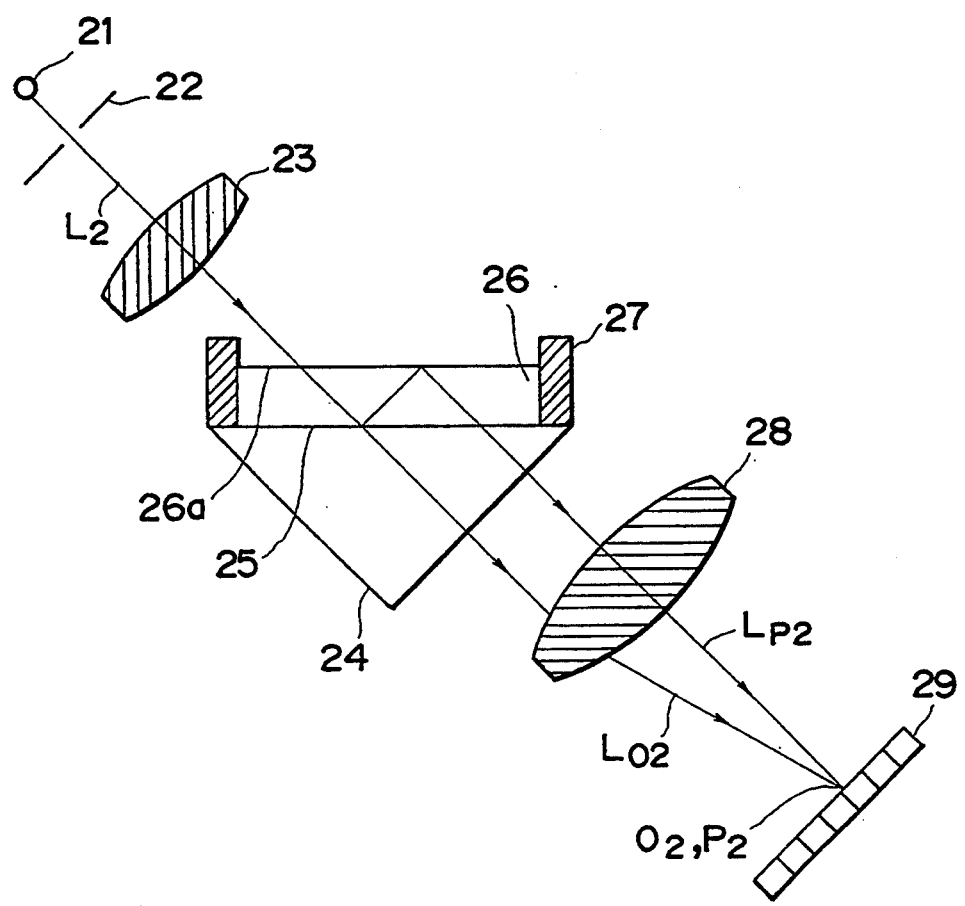
FIG. 5 is a view showing a positional relationship between an opening shape of a stop and the light receiving element in a third embodiment.

Each of the arrangements shown in FIGS. 1, 4, and 5 represents an example where the condensing position O of the beam Lo in the reference initial state coincides with the condensing position P of the beam Lp on the line sensor. Based on such a configuration, however, only the same displacement quantity with respect to the same inclination angle is obtained (what is obtained is an absolute value of the inclination angle) even when a liquid surface 6b is inclined opposite to the liquid surface 6a with the apparatus being horizontal. A judgment as to the side of incline (inclination direction) from horizontal cannot be made. If there is a necessity for obtaining the inclination direction in addition to the inclination angle, the apparatus is slightly skewed beforehand to set a reference state, whereby the position O and the position P are, as illustrated in FIG. 2, shifted by a predetermined spacing. This is set as a fiducial quantity (P−O). At this time, an inclination quantity when the liquid surface is inclined relatively to the apparatus in the reference state can be expressed by (P′−O). Hence, an inclination angle to be obtained can be given by (P′−O) 10 (P−O)=(P′−P). An inclination direction can be judged by comparing a magnitude of this inclination quantity (P′−P) with a magnitude of the fiducial quantity (P−O).

Figure 6:
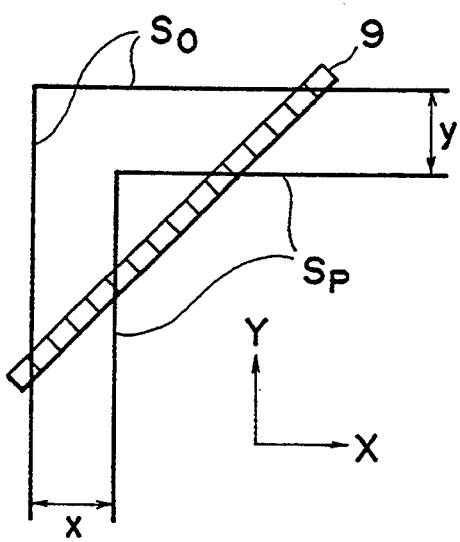
FIG. 6 is a view schematically illustrating a configuration of a fourth embodiment.
Figure 7:
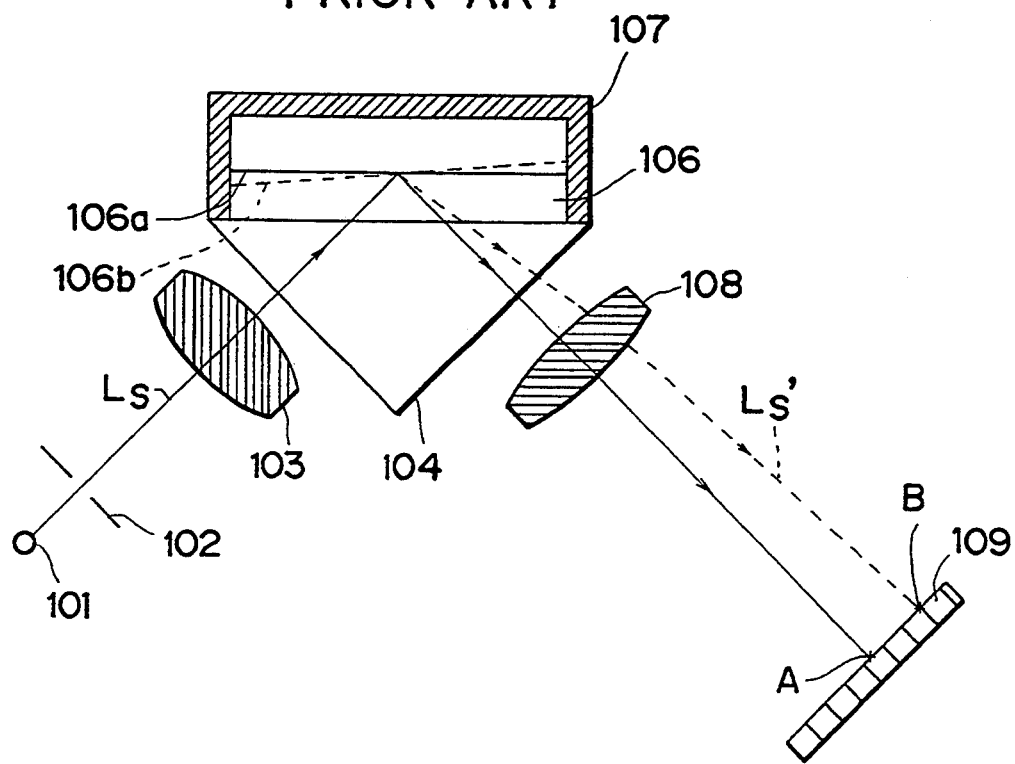
FIG. 7 is a view schematically showing a configuration of a conventional inclination angle metering apparatus.

Further, in the inclination angle metering apparatus shown in FIG. 1, an opening pattern of the slit plate 2 can assume such a configuration that first and second slits S1, S2 are, combined to provide light beams as illustrated in FIG. 6. Additionally, the line sensor 9 can be disposed in such a manner that when beams (a fiducial beam So and a metering beam Sp) passing through the slit plate are detected on the line sensor 9, the beams penetrating the first and second slits intersect the line sensor 9 at an open angle of approximately 45 degrees. With this arrangement, an inclination angle in the two-dimensional directions can be similarly metered. To be more specific, a pattern So is for the case that the beam is condensed at the position O shown in FIG. 1, and the position does not change. A pattern Sp is for the case that the beam is similarly condensed at the position P, and the position changes corresponding to the inclination angle. This pattern Sp moves within an XY two-dimensional plane in accordance with an inclination of the apparatus. Moving quantities x, y correspond to inclination angles in X and Y directions, respectively.

Further, in the embodiments discussed above, the light receiving element involves the use of the CCD line sensor. As a matter of course, however, if the light receiving element is constructed to make detections in the two-dimensional direction possible, as in the case of a CCD area sensor, inclination angles in the two-dimensional directions can be obtained, It is apparent that, a wide range of different working modes can be formed without deviating from the spirit and principles of the invention. This invention is insert not restricted by its specific working modes its scope being as set forth in the appended claims.

What is claimed is:

1. An apparatus for metering an inclination angle with respect to a surface of a liquid, comprising:
   a container for receiving said liquid;
   light projecting means for emitting a light beam;
   light receiving means;
   means for splitting said light beam from said projecting means into first and second beams, such that said first beam is incident on said light receiving means after being reflected by the surface of said liquid and said second beam is incident on said light receiving means without being reflected by the surface of said liquid; and
   means for determining said inclination angle based on an incident position of said first beam on said light receiving means and an incident position of said second beam thereon.

2. The apparatus according to claim 1, wherein said light receiving means includes a line sensor.

3. The apparatus according to claim 2, including an optical member for condensing said first and second beams on said line sensor.

4. The apparatus according to claim 2, wherein said projecting means includes a light source, a slit plate formed with first and second slits disposed on straight lines orthogonal to each other, and an optical member for substantially collimating light passing through said slit plate from said light source, and wherein said line sensor and said light projecting means are disposed such that respective portions of light passing through said first and second slits of said slit plate fall crosswise on a light receiving plane of said line sensor.

5. The apparatus according to claim 1, wherein said splitting means includes a splitting plane provided substantially in parallel to the surface of said liquid when in a horizontal state.

6. The apparatus according to claim 5, wherein said splitting means further includes first and second reflection planes provided between said splitting plane and the surface of said liquid and substantially perpendicular to said splitting plane, said first reflection plane reflects said first beam split by said splitting plane toward the surface of said liquid, and said second reflection plane reflects said first beam, after reflection by the surface of said liquid, toward said light receiving means.

7. Apparatus for metering an inclination angle with respect to a surface of a liquid comprising:
   a container for receiving said liquid;
   light source means for emitting a light beam;
   a light detector;
   means for splitting said light beam from said light source means into first and second beams, such that said first beam is incident on said light detector after being reflected by the surface of said liquid and said second beam is incident on said light detector without being reflected by the surface of said liquid; and
   means for determining said inclination angle Based on an incident position of said first beam on said light detector and an incident position of said second beam thereon.

8. The apparatus according to claim 7, wherein said light detector includes a line sensor.

9. The apparatus according to claim 8, including an optical member for condensing said first and second beams on said light detector.

10. The apparatus according to claim 8, wherein said light source means includes a light source, a slit plate formed with first and second slits disposed on straight lines orthogonal to each other, and an optical member for substantially collimating light passing through said slit plate, and wherein said line sensor and said light source means are disposed such that respective portions of light passing through said first and second slits of said slit plate fall crosswise on a light receiving plane of said line sensor.

11. The apparatus according to claim 7, wherein said splitting means includes a splitting plane provided substantially in parallel to the surface of said liquid when in a horizontal state.

12. The apparatus according to claim 11, wherein said splitting means further includes first and second reflection planes provided between said splitting plane and the surface of said liquid and substantially perpendicular to said splitting plane, said first reflection plane reflects said first beam split by said splitting plane toward the surface of said liquid, and said second reflection plane reflects said first beam, after reflection by the surface of said liquid, toward said light detector.

13. Apparatus for metering an inclination angle with respect to a surface of a liquid comprising:
a container for receiving said liquid;
light source means having a light source and an optical system for changing light of said light source to a substantially collimated light beam;
a light detector;
a splitter for splitting said light beam from said light source means into first and second beams such that said first beam is incident on said light detector after being reflected by the surface of said liquid and said second beam is incident on said light detector without being reflected by the surface of said liquid; and
means for determining said inclination angle based on an incident position of said first beam on said light detector and an incident position of said second beam thereon.

14. The apparatus according to claim 13, wherein said light detector includes a line sensor.

15. The apparatus according to claim 14, wherein said light source means includes a slit plate formed with first and second slits disposed on straight lines orthogonal to each other and an optical member for substantially collimating light passing through said slit plate, and wherein said line sensor and said light source means are disposed such that respective portions of light passing through said first and second slits of said slit plate fall crosswise on a light receiving plane of said line sensor.

16. The apparatus according to claim 13, wherein said splitter includes a splitting plane provided substantially in parallel to the surface of said liquid when in a horizontal state.

17. The apparatus according to claim 16, further including first and second reflection planes provided between said splitting plane and the surface of said liquid and substantially perpendicular to said splitting plane, said first reflection plane reflects said first beam split by said splitting plane toward the surface of the liquid, and said second reflection plane reflects said first beam, after reflection by the surface of said liquid, toward said light detector.

18. Apparatus for metering an inclination angle with respect to a surface of a liquid comprising:
a source of substantially collimated light;
a splitting member for splitting rays of said collimated light into first and second light rays;
a container for receiving said liquid with the surface of said liquid being disposed to reflect said first light rays but not said second light rays;
a detection system including a light detector and an optical member for converging and said first light rays reflected by said liquid and said second light rays toward a detecting face of said light detector, said second light rays being detected at a position which defines a fiducial position on the detecting face of said light detector, and said first light rays being detected at a position which corresponds to an inclination angle of said surface of said liquid relative to said container; and
determining means for determining the inclination angle in accordance with the detected position of said first light rays relative to the detected position of said second light rays.

* * * * *